(12) United States Patent
Ballard et al.

(10) Patent No.: US 11,909,595 B2
(45) Date of Patent: Feb. 20, 2024

(54) SYSTEM AND METHOD FOR DISTRIBUTED MANAGEMENT OF COMMUNICATION DEVICES

(71) Applicant: Dell Products L.P., Round Rock, TX (US)

(72) Inventors: Lee Eric Ballard, Georgetown, TX (US); Robert T. Stevens, Austin, TX (US); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 17/556,359

(22) Filed: Dec. 20, 2021

(65) Prior Publication Data

US 2023/0198846 A1 Jun. 22, 2023

(51) Int. Cl.
*H04L 12/46* (2006.01)
*H04L 41/12* (2022.01)

(52) U.S. Cl.
CPC .................................. *H04L 41/12* (2013.01)

(58) Field of Classification Search
CPC ............. H04L 12/4633; H04L 12/4641; H04L 47/2425; H04L 41/0806; H04L 43/16; H04L 41/083; H04L 5/0035; H04L 5/0055; H04L 5/0057; H04L 12/2869; H04L 12/5695; H04L 47/00; H04L 47/70; H04L 47/78; H04L 47/821; H04L 47/827; G06F 9/45558; G06F 9/45541; H04W 72/04

See application file for complete search history.

*Primary Examiner* — Jung Liu
(74) *Attorney, Agent, or Firm* — Womble Bond Dickinson (US) LLP

(57) ABSTRACT

Methods, systems, and devices for managing communications in a distributed system are disclosed. To improve the efficiency of communication, the system may implement the port extension protocol which may allow communication devices to utilize ports of other devices for communication purposes. To do so, the communication devices may instruct the other devices with respect to how the communication devices expect the other devices to process data units transmitted via networks (e.g., network data units). However, not all of the other devices that may process the network data units may include functionality to process and/or implement the instructions from the communication devices. To extend the functionality of such devices, a remote control plane for devices that lack this processing functionality may be provided.

20 Claims, 10 Drawing Sheets

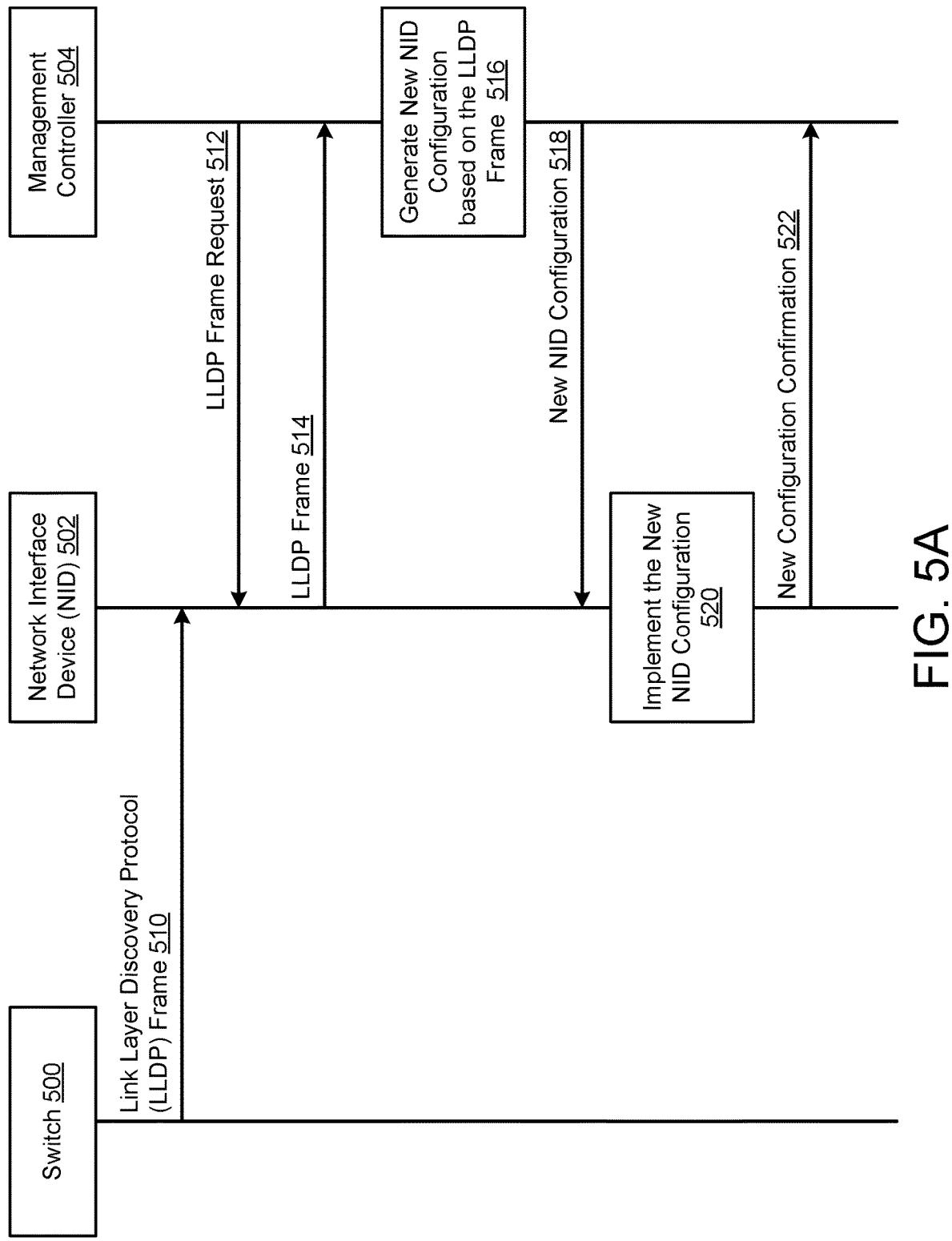

SYSTEM AND METHOD FOR DISTRIBUTED MANAGEMENT OF COMMUNICATION DEVICES

FIELD DISCLOSED HEREIN

Embodiments disclosed herein relate generally to communication management. More particularly, embodiments disclosed herein relate to systems and methods to extend communication management functionality in a distributed system.

BACKGROUND

Computing devices may provide various services. For example, computing devices may host applications that store data, process data, and generate data thereby providing services. Depending on the type of processing performed, various types of services may be performed.

BRIEF DESCRIPTION OF THE DRAWINGS

Embodiments disclosed herein are illustrated by way of example and not limitation in the figures of the accompanying drawings in which like references indicate similar elements.

FIGS. 5A-5B show diagrams illustrating operation of a system over time in accordance with an embodiment.

DETAILED DESCRIPTION

Figure 1A:
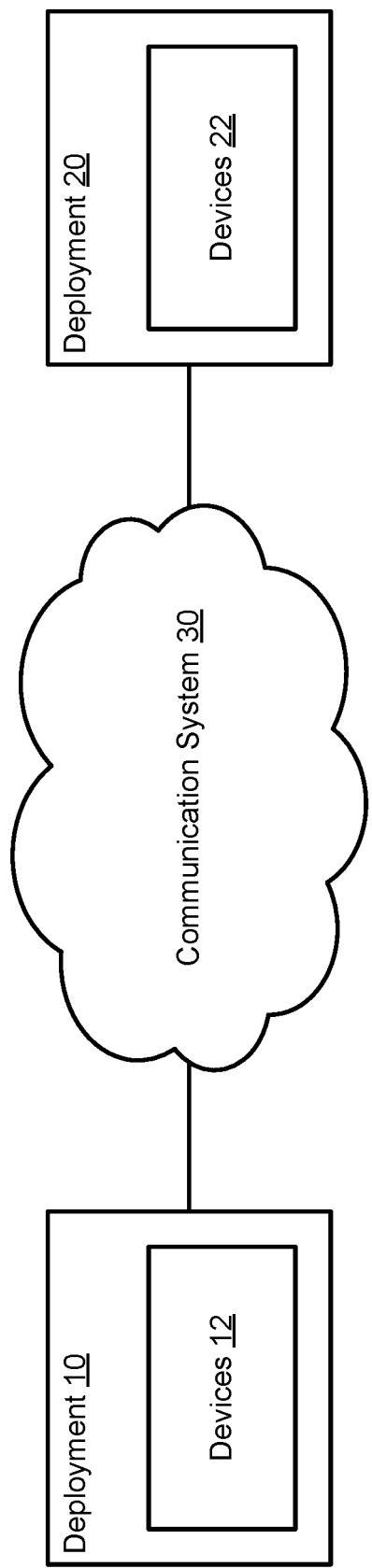
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

In general, embodiments disclosed herein relate to methods, systems, and devices for managing communications in a distributed system. To manage communications in the distributed system, multiple devices may cooperate to improve the efficiency of communicating.

To improve the efficiency of communication, the system may implement the port extension protocol which may allow switches or other types of switching, routing, and/or bridging devices (e.g., "communication devices") to utilize ports of other devices for communication purposes. To do so, the communication devices may instruct the other devices with respect to how the communication devices expect the other devices to process data units transmitted via networks (e.g., network data units). However, not all of the other devices that may process the network data units may include functionality to process and/or implement the instructions from the communication devices.

To extend the functionality of such devices, embodiments disclosed herein may implement a remote control plane for such devices. For example, a network interface device (NID) may not include sufficient computing resources or functionality to appropriately process the instructions from the communication devices. Accordingly, the NID in isolation may not be able to comply with the instructions, thereby rendering the communication devices unable to utilize the ports or otherwise rely on the NID operating in a manner desired by the communication device (e.g., at least for port extension protocol purposes).

To allow such NIDs (or other types of devices) to cooperate with the communication devices (at least for port extension protocol purposes), the remote control plane may be hosted by a management controller of a devices that also hosts the NID. When a NID receives the instructions from the communication device (e.g., a top of rack switch), the NID may pass the instructions to the management controller which may process the instructions to obtain a new configuration for the NID. Once obtained, the management controller may apply the new configuration to the NID thereby allowing a NID that lacks the ability to process port extension protocol operations to comply with the operations.

In this manner, embodiments disclosed herein may improve the operation of devices in a distributed system by providing devices with new functionalities. The resulting improved distributed system may more efficiently process communications thereby allowing for improved communication throughput, reduced energy consumption for communication processing, and/or other benefits such as improved security and different operational models that allow network managers to manage virtual local area network assignment, monitor flows, and facilitate other network management functions.

In an embodiment, a computer-implemented method for operating an information handling system (IHS) is provided. The method may include obtaining, by a network interface device of the IHS and from a switch, a frame specifying a port extension protocol operation; providing, by the network interface device, the frame to a management controller hosted by the IHS; providing, by the management controller, the frame to a virtual network interface device hosted by the management controller, the virtual network interface device reflecting network connectivity of the network interface device and having port extension protocol processing capability; processing, by the virtual network interface device, the port extension protocol operation to obtain a new configuration for a network data unit processor of the network interface device; reconfiguring, by the management controller, the network data unit processor based on the new configuration to obtain an updated network interface device; and providing, based on the updated network interface device, an acknowledgement to the switch indicating that the updated network interface device will operate in accordance with the port extension protocol operation.

In an embodiment, the switch is directly connected to the network interface device.

Providing the frame to the virtual network interface device may include writing the frame to a virtual port of the virtual network interface device, the virtual port of the virtual network interface device corresponding to a port of the network interface device on which the frame was received.

Providing the acknowledgement to the switch may include providing the acknowledgement to the updated network interface device; and sending, by the network interface device, the acknowledgement to the switch via the port of the network interface device on which the frame was received.

The updated network interface device may perform network data unit processing for network data units received from the switch differently from the network interface device.

The frame may be a link layer discovery protocol frame.

The port extension protocol operation may be stored in a type-length-value structure of the frame.

The computer-implemented method of claim 7, wherein the frame comprises a control information portion and a link layer discovery data unit portion, the link layer discovery data unit portion comprising the type-length-value structure.

The computer-implemented method may also include obtaining, by the network interface device, port information specifying from which port of the network interface device the frame was received; and providing, by the network interface device, the port information along with the frame to the management controller.

The management controller may include a computing device that is hosted by the IHS, operates independently from the IHS, and is operably connected to the network interface device via a bus, wherein the bus provides for communications between other components of the IHS.

A non-transitory media may include instructions that when executed by a processor cause the computer-implemented method to be performed.

An information handling system may include the non-transitory media and a processor, and may perform the computer-implemented method when the computer instructions are executed by the process.

Turning to FIG. 1A, a block diagram illustrating a system in accordance with an embodiment is shown. The system may include deployments 10, 20 that provide computer implemented services. The computer implemented services may include, for example, database services, instant messaging services, video conferencing services, etc. To provide these services, the deployments may include devices 12, 22.

As part of providing the computer implemented services, devices 12, 22 may need to communicate with one another and/or other devices. To provide for communications between devices 12, 22 and/or other devices, the system may include communication system 30. Communication system 30 may include one or more wired and/or wireless network that allow for devices operably connected to it to communication with other devices operably connected to it. In an embodiment, communication system 30 includes the Internet, other types of public networks, and/or private network (and/or other types of system for facilitating communications such as circuit switched networks, packet based networks, etc.).

Any of devices 12, 22 may be implemented in any format such as, for example, a chassis based format allowing for devices 12, 22 to be incorporated into a high density computer environment such as a data center, a rack of devices, etc.

Figure 1B:
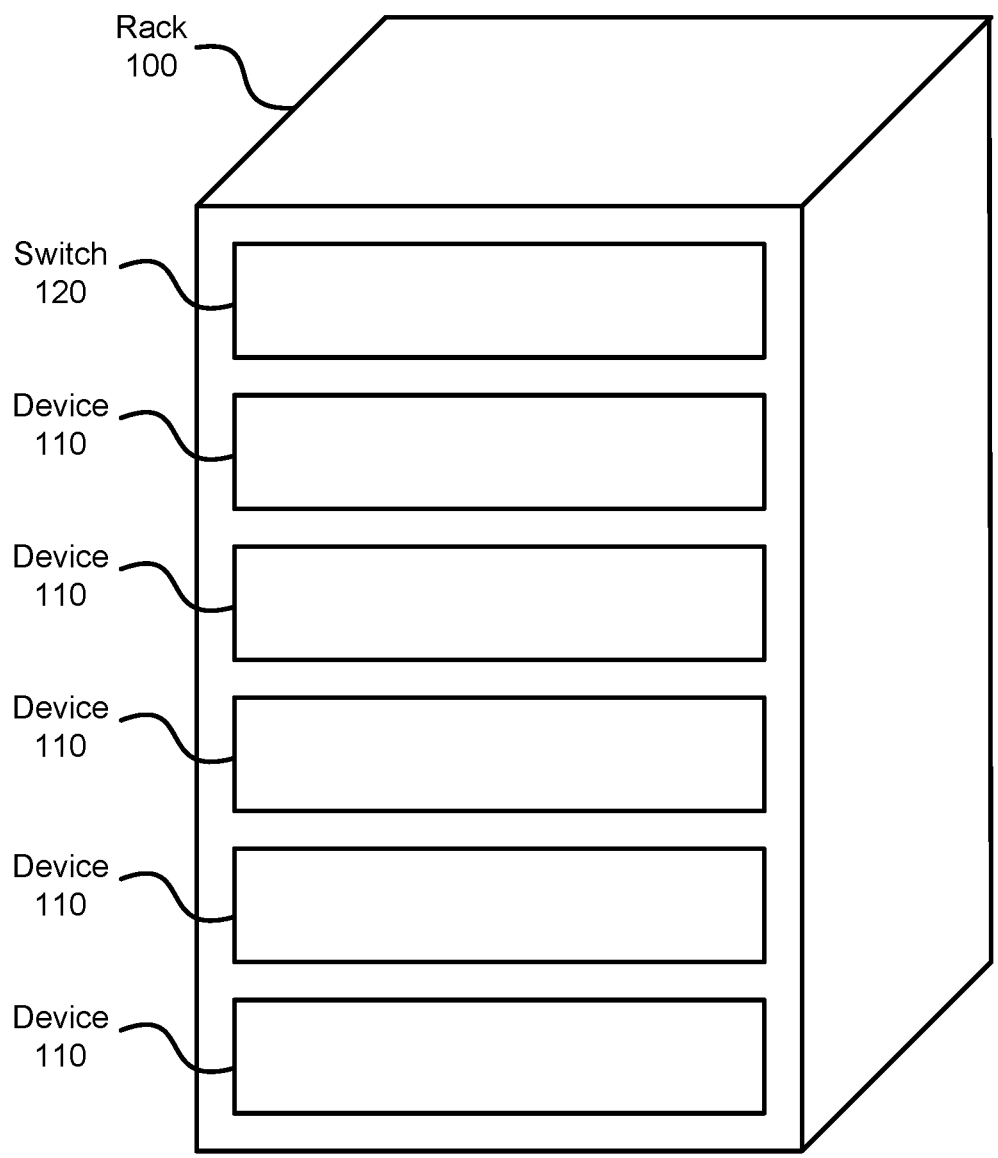
FIG. 1B shows a block diagram illustrating a rack in accordance with an embodiment.

Turning to FIG. 1B, a diagram of rack 100 in accordance with an embodiment is shown. Rack 100 may be a physical device for arranging and/or positioning any number of devices 110 with respect to one another and/or other devices. Devices 110 may be similar to any of devices 12, 22 shown in FIG. 1A.

Rack 100 may also include one or more systems for distributing power to devices 110, facilitating communications between devices 110 and/or other devices (not shown), thermally managing device 110, and/or providing other services to devices 110. While described and illustrated with respect to rack 100, other structures may be used to position and service device 110 without departing from embodiments disclosed herein.

To facilitate communications between devices 110 and other devices, rack 100 may include switch 120. Switch 120 may be implemented as, for example, a top of rack (TOR) switch and may be operably connected to any of device 110. In some embodiments, rack 100 may be implemented using a switchless cluster in which link partners are utilized to manage network communications. Such switchless clusters may utilize star or ring topologies that facilitate direct connectivity. Thus, in some embodiments, a rack may not include a switch or other type of network data unit routing/switching device. Rather, the rack may be implemented with a switchless network topology.

Switch 120 may also be connected to communication system 30 shown in FIG. 1A. Switch 120 may generally provide packet switching services. For example, switch 120 may be implemented as layer 2 switch and/or may include higher layer functionality (e.g., in the Open System Interconnection (OSI) networking model). Switch 120 may be implemented using different models such as the TCP/IP model of the Internet Protocol Suite without departing from embodiments disclosed herein.

As part of its functionality, switch 120 may implement a port extension protocol. The port extension protocol may allow the switch to utilize network components of any of device 110 to provide certain functionalities. For example, through the port extension protocol, switch 120 may be able to manage the ports on the network components as though they are a part of switch 120, thereby allowing for a greater degree of flexibility in managing network traffic.

For example, any of devices 110 may host virtual machines or other entities that logically present themselves as independent network endpoints to which traffic may be directed. To efficiently manage traffic directed to these entities, switch 120 may implement the port extension protocol to manage and/or partition the operation of network interface devices (NIDs) hosted by any of device 110. The NIDs may be managed by modifying the manner in which the NIDs respectively process traffic (e.g., network data units) received from switch 120. To do so, the operation of network data unit processors of the NIDs may be reconfigured in accordance with instructions from switch 120.

In an embodiment, switch 120 sends information regarding port extension protocol operations to the NIDs via Ethernet frames. The Ethernet frames may be sent as part of the link layer discovery protocol. The Ethernet frames may include type-length-value fields in which information regarding port extension protocol operations are embedded.

However, in an embodiment, one or more of device 110 include a NID that lacks the ability to process port extension protocol operations. For example, the NID may lack sufficient processing, memory, and/or other types of computing resources sufficient to process the port extension protocol operations (or may simply lack the functionality to process such operations).

In general, embodiments disclosed herein may provide methods and systems for facilitating implementation of the port extension protocol with devices that lack the capability of processing port extension protocol operation commands. To do so, embodiments disclosed herein may provide a device that is able to retrieve and process port extension operations for NIDs. Processing the port extension protocol operations may result in a new configuration for the operation of a network data unit processor of a NID being obtained. Once obtained, the new configuration may be applied to the network data unit processor thereby causing the NID to operate in a manner expected by a switch for port extension protocol purposes (e.g., may processes network data units in a manner that allows the switch to operate as though the ports of the NID are part of or otherwise directly managed by the switch).

While illustrated in FIG. 1B with a limited number of specific components, a rack may include additional, fewer, and/or different components without departing from embodiments disclosed herein.

Figure 1C:
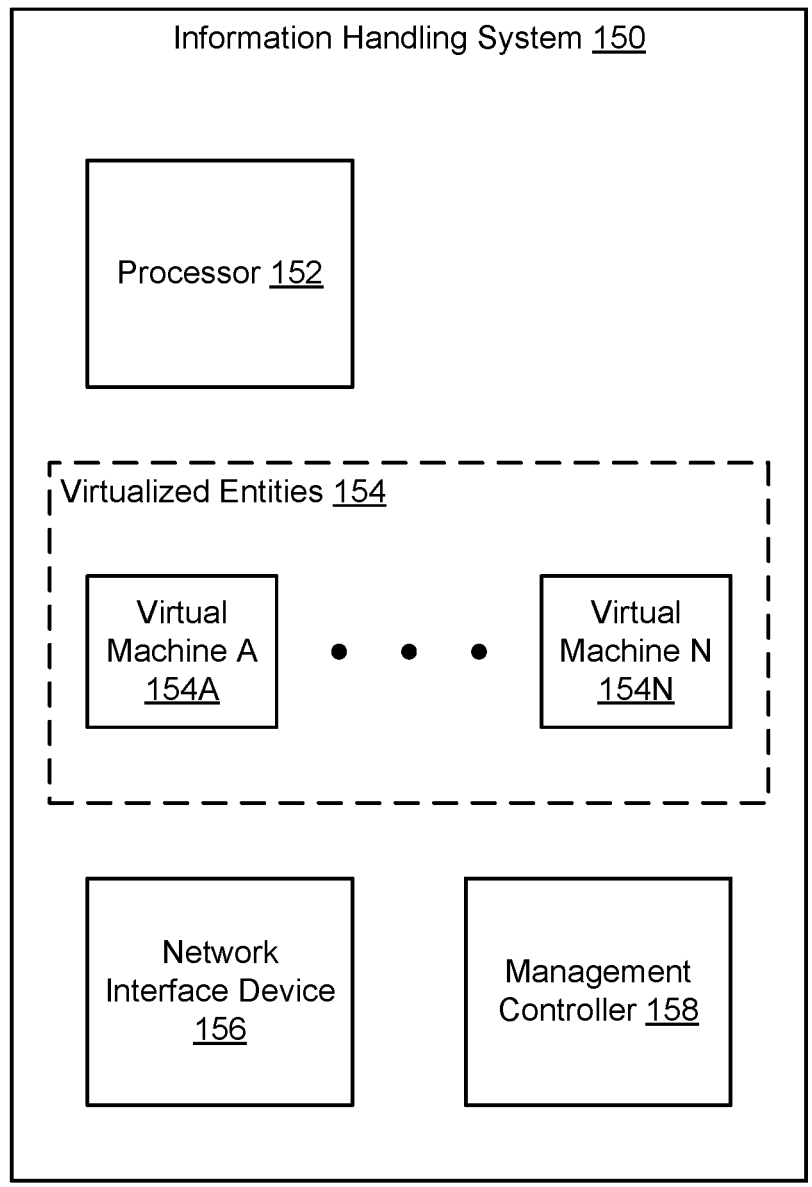
FIG. 1C shows a block diagram illustrating an information handling system in accordance with an embodiment.

Turning to FIG. 1C, a diagram of an information handling system (IHS) 150 in accordance with an embodiment is shown. IHS 150 may be similar to any of device 110. IHS 150 may provide any type and quantity of computer implemented services (e.g., in isolation and/or cooperation with other information handling systems of a deployment).

To provide its functionality, IHS 150 may include processor 152, virtualized entities 154, network interface device (NID) 156, and management controller 158. Each of these components is discussed below.

Processor 152 may be implemented with a hardware processor. Processor 152 may be operably connected to any quantity and type of other hardware components (e.g., memory modules, storage devices, etc.), as well as NID 156 and management controller 158.

Virtualized entities 154 may provide the computer implemented services provided by IHS 150. Virtualized entities 154 may be implemented with virtual machines, containers, and/or other methods of sharing limited computing resources provided by the hardware components of IHS 150. To provide the computer implemented services, different virtual machines 154A-154N may host similar or different instances of applications. While not illustrated herein, virtualized entities 154 may utilize one or more layers of abstraction (e.g., a virtualization layer that provides timeslide computing resource access) to utilize the hardware components of IHS 150.

As part of their respective operation, any of virtual machines 154A-154N may need to communication with other entities. To do so, each of the virtual machines may be associated with a logical network endpoint (e.g., a media access control address) and may be a part of a virtualized network such that communications from other entities directed to respective virtual machines may be efficiently processed and directed with NID 156.

To provide for efficient processing of network data units, a switch operably connected with NID 156 may treat NID 156 as being capable of performing the port extension protocol even though NID 156 may be unable to process port extension protocol operations received from switch 120.

Generally, NID 156 may provide network data unit processing services. To do so, NID 156 may include a network data unit processor capable of, for example, using control information from network data units to appropriately process (e.g., decapsulation) payloads from the network data units. Likewise, NID 156 may be capable of processing (e.g., encapsulation) payloads for transmission to other devices in accordance with one or more communication protocols.

However, when operating to support port extension of a switch, NID 156 may need to perform different types of processing. These changes to the processing performed by NID 156 may be implemented through reconfiguration of a network data unit processor of NID 156.

To facilitate its reconfiguration, NID 156 may be adapted to provide, to management controller 158, certain types of information regarding port extension protocol operations obtained from a switch (e.g., that intends to utilize NID 156 for port extension purposes), as well as information regarding ports through which the port extension protocol operations were obtained. As will be discussed below, management controller 158 may utilize this information to decide how to configure NID 156 such that NID 156 operates in compliance with a port extension protocol implemented by a switch operably connected to NID 156 through an Ethernet link.

In an embodiment, one or more of processor 152 and network interface device 156 is implemented using a hardware device including circuitry. The hardware device may be, for example, a digital signal processor, a field programmable gate array, or an application specific integrated circuit. The circuitry may be adapted to cause the hardware device to perform the functionality of processor 152 and network interface device 156. Processor 152 and network interface device 156 may be implemented using other types of hardware devices without departing embodiment disclosed herein.

In one embodiment, any of virtualized entities 154 are implemented using a processor adapted to execute computing code stored on a persistent storage that when executed by the processor performs the functionality of virtualized entities 154 discussed throughout this application. The processor (e.g., 152) may be a hardware processor including circuitry such as, for example, a central processing unit, a processing core, or a microcontroller. The processor may be other types of hardware devices for processing information without departing embodiment disclosed herein.

Management controller 158 may provide port extension protocol operation processing services. The services may include (i) hosting a virtualized model of NID 156 that includes port extension protocol operation processing functionality, (ii) obtaining information regarding port extension protocol operations received by NID 156, (iii) processing the port extension protocol operation using the virtualized model of NID 156 to obtain a new configuration for NID 156, and (iv) reconfiguring the operation of NID 156 using the new configuration for NID 156. The new configuration may include, for example, changes the manner in which control information is processed, the manner in which payloads are encapsulated/decapsulated, and/or other changes in the operation of NID 156. In other words, management controller 158 may operate as a control plane for NID 156 such that NID 156 may operate as though it includes port extension protocol functionality.

Figure 1D:
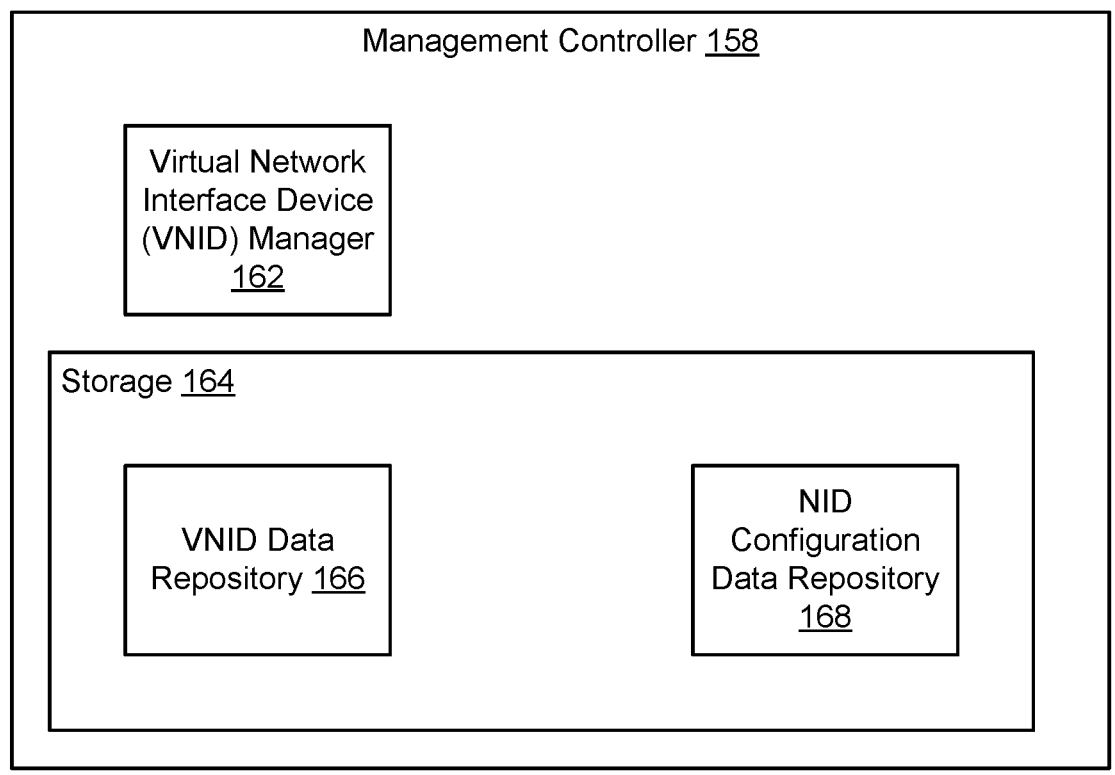
FIG. 1D shows a block diagram illustrating a management controller in accordance with an embodiment.

Management controller 158 may be implemented with a computing device. The computing device may be hosted by IHS 150 and may operate independently from IHS 150. For example, management controller 158 may be implemented with an out of band management controller. Management controller 158 may be operably connected to NID 156 and/or other components of IHS 150. Through the aforementioned connection, management controller 158 may obtain copies of network data units from NID 156, may obtain information regarding how the network data units were obtained (e.g., port information), and/or may initiate reconfiguration of NID 156. Management controller 158 may also send communications via NID 156 to other devices such as a switch that performs the port extension protocol with NID 156. Refer to FIG. 1D for additional details regarding management controller 158.

While illustrated in FIG. 1C with a limited number of specific components, a IHS may include additional, fewer, and/or different components without departing from embodiments disclosed herein.

Turning to FIG. 1D, a block diagram of management controller 158 in accordance with an embodiment disclosed herein is shown. As discussed above, management controller 158 may provide port extension protocol operation processing services. To do so, management controller 158 may include virtual network interface device (VNID) manager 162 and storage 164. Each of these components is discussed below.

VNID manager 162 may provide the port extension protocol processing services. To do so, VNID manager 162 may (i) maintain a virtualized instance of a NID using VNID data repository 166, (ii) obtain information regarding port extension protocol operations received by NID, (iii) process the port extension protocol operations using the virtualized instance of the NID to obtain new configurations for the NID, and (iv) apply the new configurations to the NID.

In an embodiment, VNID manager 162 is implemented using a hardware device including circuitry. The hardware device may be, for example, a digital signal processor, a field programmable gate array, or an application specific integrated circuit. The circuitry may be adapted to cause the hardware device to perform the functionality of VNID manager 162. VNID manager 162 may be implemented using other types of hardware devices without departing embodiment disclosed herein.

In an embodiment, VNID manager 162 is implemented using a processor adapted to execute computing code stored on a persistent storage that when executed by the processor performs the functionality of VNID manager 162 discussed throughout this application. The processor may be a hardware processor including circuitry such as, for example, a central processing unit, a processing core, or a microcontroller. The processor may be other types of hardware devices for processing information without departing embodiment disclosed herein.

Figure 2:
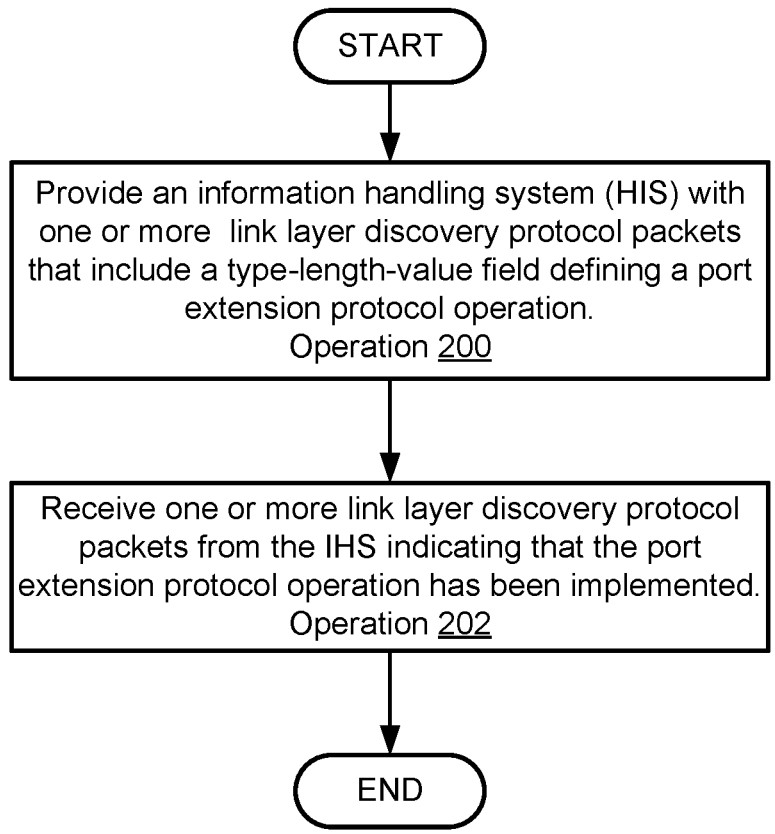
FIG. 2 shows a flow diagram illustrating a method of modifying communication management in a distributed system in accordance with an embodiment.
Figure 3:
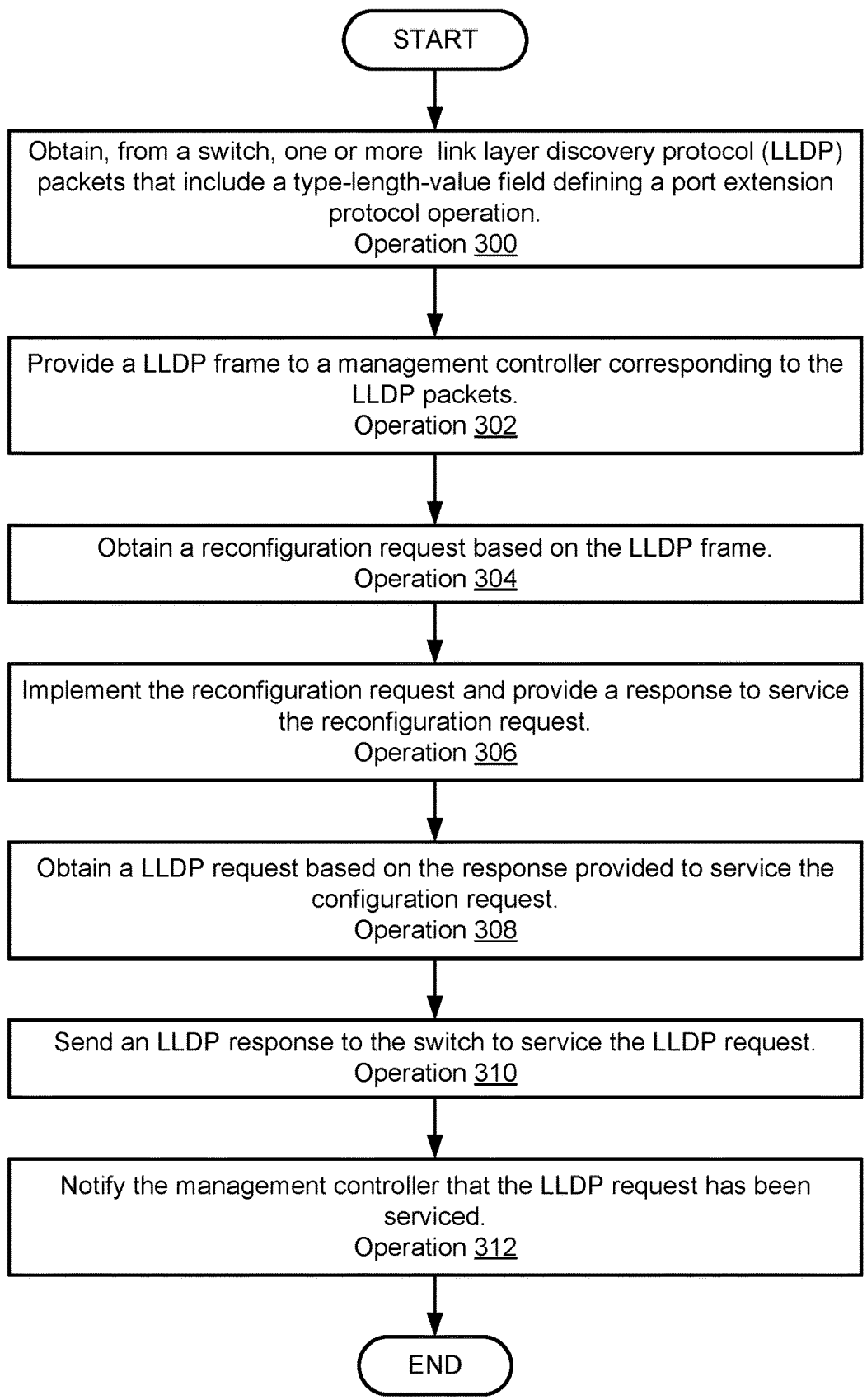
FIG. 3 shows a flow diagram illustrating a method of managing configuration of a network interface device in accordance with an embodiment.
Figure 4:
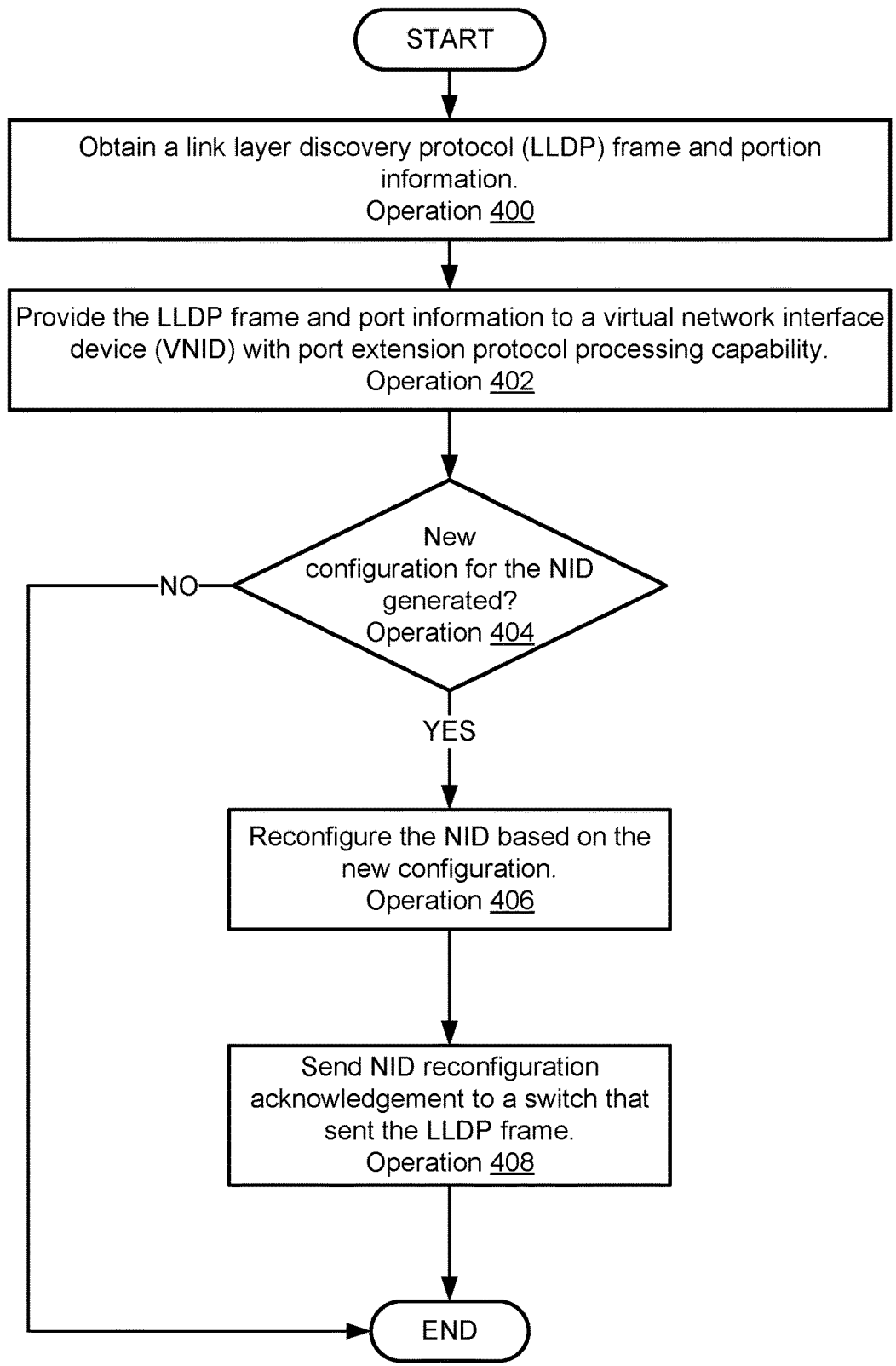
FIG. 4 shows a flow diagram illustrating a method of processing a port extension protocol operation in accordance with an embodiment.

While providing its functionality, VNID manager 162 may perform all, or a portion, of the methods illustrated in FIGS. 2-4.

In an embodiment, storage 164 is implemented using physical devices that provide data storage services (e.g., storing data and providing copies of previously stored data). The devices that provide data storage services may include hardware devices and/or logical devices. For example, storage 164 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 164 may include a memory device (e.g., a dual in line memory device) in which data is stored and from which copies of previously stored data are provided. In another example, storage 164 may include a persistent storage device (e.g., a solid-state disk drive) in which data is stored and from which copies of previously stored data is provided. In a still further example, storage 164 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 164 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 164 may store data structures including VNID data repository 166 and NID configuration data repository 168.

VNID data repository 166 may be implemented with one or more data structures that store information usable to operate a virtualized NID. For example, VNID data repository 166 may include an image or another type of data structure that allows for an instance of a VNID to be instantiated.

NID configuration data repository 168 may be implemented with one or more data structure that include information regarding the configuration of a NID. When operating, the VNID may be configured using the information included in the NID configuration data repository 168 such that the operation of the VNID matches that of the operation of the NID. For example, the VNID may use the aforementioned information to establish virtual port interfaces (TAPs) corresponding to ports of the NID.

However, in contrast to the NID, the VNID may include functionality to process port extension protocol operations. When the VNID processes a port extension protocol operation, the VNID may update the NID configuration data repository 168 thereby causing it to diverge from that of the actual NID. However, these changes may be used to reconfigure the NID to match the operation of the VNID after the VNID processes the port extension protocol operation.

While various data structures have been illustrated and described in FIGS. 1A-1D with specific structures, any of the data structures may be implemented with different structures (e.g., lists, tables, linked lists, databases, etc.), stored in different locations, and/or spanned across any number of devices without departing from embodiments disclosed herein.

While illustrated in FIG. 1D with a limited number of specific components, a management controller may include additional, fewer, and/or different components without departing from embodiments disclosed herein.

As discussed above, the components of FIG. 1 may perform various methods to facilitate communications in a distributed environment. FIGS. 2-5 illustrate examples of methods that may be performed by the components of FIG. 1.

Turning to FIG. 2, a flow diagram illustrating a method of modifying a port extension configuration in accordance with an embodiment is shown. The method illustrated in FIG. 2 may be performed by a switch that is extending one or more ports to an IHS. The switch may utilize the extended port to manage network data unit traffic. Over time, the switch may need to update the configuration of a NID of the IHS to manage the network data unit traffic. The switch may perform the operations shown in FIG. 2 when it determines that a configuration of the NID may need to be modified for the switch to continue to extend one or more ports to the NID.

At operation 200, an IHS is provided with one or more link layer discovery protocol (LLDP) packets that include a type-length-value (TLV) field defining a port extension protocol operation. The switch may be directly connected to the IHS via an Ethernet link.

In an embodiment, the TLV field is a flexible field that may carry various types of data and is not dedicated to carrying port extension protocol operations.

In an embodiment, the port extension protocol operation specifies one or more changes in the manner in which network data units are processed.

At operation 202, one or more LLDP packets are received from the IHS that indicate that the port extension protocol operation has been implemented. The LLDP packets received from the IHS may be received on a port from which responses to the LLDP packets provided to the IHS are expected to be received.

The method may end following operation 202.

Turning to FIG. 3, a flow diagram illustrating a method of processing a port extension protocol operation with an embodiment is shown. The method illustrated in FIG. 3 may be performed by an IHS that is extending one or more ports for a switch. The switch may utilize the extended port to manage network data unit traffic. Over time, the switch may need to update the configuration of a NID of the IHS to manage the network data unit traffic. The IHS may perform the operations shown in FIG. 3 to match the operational expectations of the switch.

At operation 300, one or more LLDP packets are obtained from a link partner (e.g., a switch). The LLDP packets may include a TLV field defining a port extension protocol operation. For example, the TLV may include a port extension control indicating that the switch intends to change its network data unit processing behavior. The port extension control may specify how the change will be implemented and/or expectations regarding the operation of a NID of the IHS used by the switch to implement the port extension protocol.

In an embodiment, the one or more LLDP packets (e.g., a type of network data unit) are obtained by the NID. The NID may be adapted to retain a copy of the last LLDP packet, corresponding port information from with which the LLDP packet was sent, and/or port information on which the LLDP packet was received (e.g., enhanced LLDP packet information). The enhanced LLDP packet information may be used to conceal, from a VNID hosted by a management controller and the link partner, the fact that these two entities are not connected to one another. The enhanced LLDP packet information may be used to transmit network data units used for control purposes (e.g., LLDP packets) between these entities in a manner that allows them to operate as though they were connected to one another using the NID as an intermediary.

At operation 302, the LLDP frame is provided to a management controller. The management controller may request the LLDP frame. The LLDP frame may include, at least, the port extension protocol operation and/or port information associated with the LLDP packets through which the port extension protocol operation was received. The port information may include, for example, an identifier of the port. The port information may allow a management controller to cause the LLDP frame to be ingested by a VNID on a virtual port corresponding to the port on which the LLDP frame was received.

Thus, the port information may be used to facilitate port correspondence between the NID and VNID hosted by a management controller in a manner that allows a link partner (e.g., a switch) to operate in a manner consistent with a NID that includes full port extension protocol operation processing capability while the NID does not in fact include such capabilities. Likewise, the VNID may be able to operate in a manner consistent with being in direct communication with the link partner while not actually being in direct communication with the link partner.

As will be discussed in greater detail below, the management controller may process the LLDP frame and/or port information to obtain a new configuration for the NID.

At operation 304, a reconfiguration request is obtained from the management controller. The configuration request may be based on the LLDP frame and/or port information provided in operation 302.

In an embodiment, the reconfiguration request specifies one or more changes to the operation of the NID of the IHS.

At operation 306, the reconfiguration request is implemented. For example, the reconfiguration request may be implemented by storing reconfiguration data in the NID or by performing other actions based on the reconfiguration request. In an embodiment, a response is provided to the management controller to service the reconfiguration request. The response may inform the management controller that the NID has been reconfigured to match expected operation of the NID by the switch for port extension protocol purposes.

At operation 308, a LLDP request based on the response provided to service the configuration request is received. The LLDP request may indicate that the IHS will operate in accordance with the expectations specified in the one or more LLDP packets obtained at operation 300. In other words, the LLDP request may serve as an acknowledgement of the port extension protocol operation being implemented.

At operation 310, a LLDP response is sent to the switch to service the LLDP request. For example, the NID may generate one or more LLDP packets/frames based on the LLDP request and send it to the switch as the LLDP response. The LLDP response may be sent to the switch (e.g., a link partner) out of a port corresponding to the port on which the LLDP packets were received in operation 300. For example, the LLDP request received at operation 308 may include enhanced LLDP packet information, port information, etc., or other types of information usable to facilitate port correspondence between a VNID hosted by the management controller and the NID.

At operation 312, the management controller is notified that the LLDP request has been serviced. The notification may be made after the LLDP response is sent.

The method may end following operation 312.

Using the method illustrated in FIG. 3, a management controller may serve as a control plane for a NID in a manner that allows the NID to perform various higher level functions that it would not otherwise be capable of implementing. For example, the NID may be empowered to provide port extension protocol functionality for a switch by virtue of the management controller implemented control plane for the NID.

Turning to FIG. 4, a flow diagram illustrating a method of deploying a new configuration for a link partner, such as a NID, in accordance with an embodiment is shown. The method illustrated in FIG. 4 may be performed by a management controller to manage a configuration of a NID.

At operation 400, a LLDP frame and port information is obtained. The LLDP frame may be obtained from the NID. The NID may have obtained the LLDP via a port. The LLDP frame may include the payload of a LLDP packet including a port extension protocol operation. The port information may include information a port (e.g., an identifier) of the NID on which the LLDP packet was received, and/or other information which the NID has access when one or more LLDP packets was received by the NID. The port information may be used, determine how to provide information regarding the LLDP frame to other entities.

At operation 402, the LLDP frame is provided to a VNID with port extension protocol processing capabilities. The LLDP frame may be provided by writing the frame to a virtual port of the VNID. The VNID virtual port may correspond to the port on which the LLDP packet was received by the NID. The correspondence may be used to route communications between the NID and the VNID in a manner that allows the VNID to operate as though it is connected to a link partner while the NID is actually connected to the link partner.

For example, the port information obtained in operation 400 may be used to identify a corresponding virtual port of the VNID. Consequently, LLDP frames received by a NID may be provided to the VNID via corresponding ports. In this manner, the LLDP information received by the VNID may duplicate that received by the NID. As will be discussed below, similar procedures may be utilized to ensure that acknowledgements or other communications generated by the VNID and directed to a link partner are transmitted to the link partner via corresponding ports of the NID.

In an embodiment, the NID and management controller are operably connected via an interconnect that does not implement the same communication protocols implemented by the ports of the NID and the VNID. To manage port correspondence between the NID and VNID hosted by the management controller, a communication protocol over the interconnect may be established with a number of logical channels corresponding to the number of ports of the NID and VNID. When a LLDP packet is received by the NID, the LLDP frame associated with the LLDP packet may be sent over a logical channel corresponding to the port of the NID on which the packet was received. When the management controller receives the frame, the management controller may write the LLDP frame to a port corresponding to the logical channel. In this manner, port correspondence between the NID and VNID may be maintained. The correspondence between ports of the NID and virtual ports of the VNID may be maintained via other methods without departing from embodiments disclosed herein.

Likewise, when the VNID generates a responsive communication, the responsive communication may be transmitted out of a port of the VNID, transmitted over a logical channel corresponding to the port to the NID, and may be pushed to the NID for transmission out of a corresponding port. Thus, via the aforementioned process, the VNID may operate as though it is connected to the link partner while the NID provides for the actual connectivity to the link partner.

Once received, the VNID may process the port extension protocol operation of the LLDP frame. The processing may cause a new configuration for the VNID to be generated. By virtue of being received via a virtual port corresponding to a port of the NID, the VNID may not need to undertake special procedures for processing the LLDP frame and port extension protocol operation included therein.

At operation 404, it is determined whether a new configuration for the NID was generated. The determination may be made based on whether a new configuration for the VNID was obtained at operation 402. If a new configuration for the VNID was obtained, then it may be determined that a new configuration for the NID was generated.

If a new configuration for the NID is generated, then the method may proceed to operation 406. Otherwise the method may end following operation 404. The method ending may indicate that the NID does not need to be reconfigured in order to comply with the port extension protocol operation.

At operation 406, the NID is reconfigured based on the new configuration. The new configuration may be changes made to the VNID in operation 402 when the port extension protocol operation is processed by the VNID. The NID may be reconfigured by sending information/instructions to the NID that cause it to reconfigure itself in accordance with the new configuration. For example, forwarding information tables, packet classification tables, and/or other types of data structures used by the NID to processes network data units may be updated.

The NID may acknowledge when the reconfiguration is complete.

At operation 408, a NID reconfiguration acknowledgement is sent to a link partner (e.g., a switch) that sent the LLDP frame. To send the reconfiguration acknowledgement, the NID acknowledgement of its reconfiguration may be provided to the VNID which, in turn, may generate a TLV indicating the acknowledgement. The TLV may be packaged as part of a LLDP packet which may be sent by the VNID via a virtual port to a manager (e.g., 162) hosted by the management controller. In turn, the manager may instruct the NID to send the LLDP packet to the link partner (e.g., switch) as a response to the LLDP frame obtained in operation 400.

The VNID may send the NID reconfiguration acknowledgement out of the same virtual port on which the LLDP frame was received (e.g., in accordance with normal LLDP frame processing). Consequently, the NID reconfiguration acknowledgement may be automatically routed out of a corresponding port of the NID to the link partner.

For example, the NID reconfiguration acknowledgement may be sent to the NID via a logical channel corresponding to the virtual port out of which the NID reconfiguration acknowledgement is sent by the VNID. By being send over the logical channel, the NID reconfiguration acknowledgement may be pushed to the NIC for transmission out of a corresponding port to the link partner.

In this manner, the communications received by the link partner may match those expected for LLDP packet transmission in accordance with the LLDP protocol, even though the NID is not actually processing the LLDP frames (or at least the port extension protocol operation).

The method may end following operation 408.

Figure 5B:
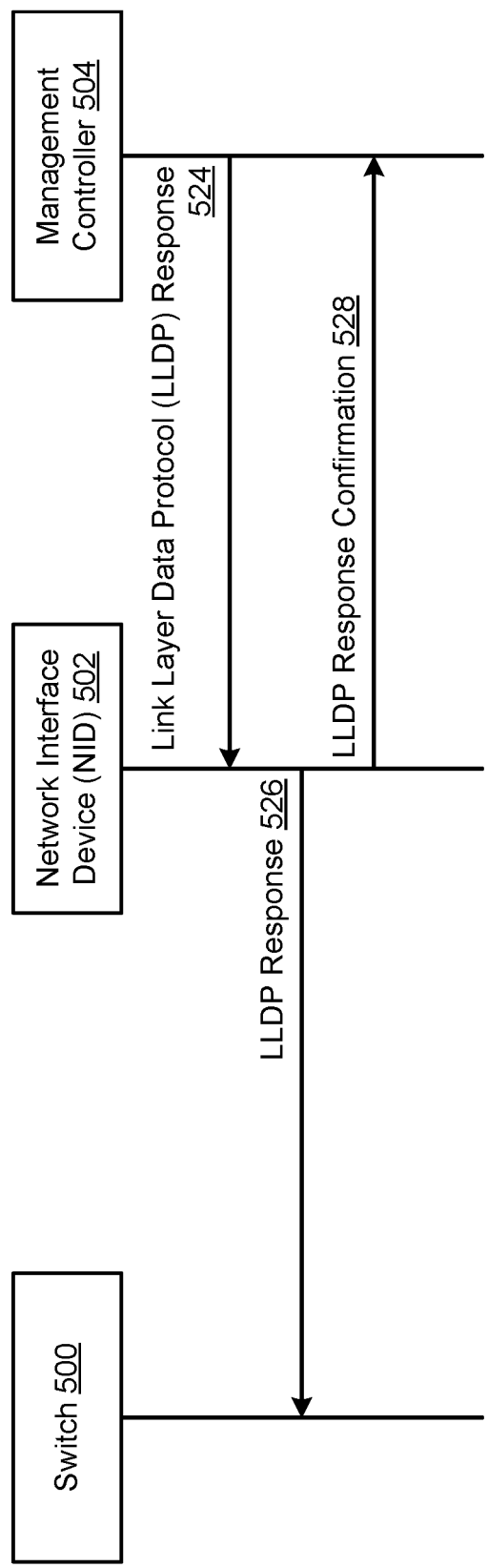

To further clarify various embodiments, FIGS. 5A-5B illustrate operations that may be performed by components of system similar to that illustrated in FIGS. 1A-1D, which similarly named components being similar to one another. In these figures, the respective components (e.g., switch 500, NID 502 of an IHS, and management controller 504 of the IHS) are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

At block 510, switch 500 sends a LLDP frame to NID 502. The LLDP frame includes a port extension protocol operation as part of a TLV portion of the frame. When received, NID 502 retains the LLDP frame associated with the port on which it was received on.

At block 512, management controller 504 sends a LLDP frame request for the port. In response to the request, at block 514, the NID provides the LLDP frame to management controller 504.

Using the LLDP frame, at block 516, management controller 504 generates a new NID configuration. To do so, management controller 504 may provide the LLDP frame to a VNID for the NID. The VNID may process the port extension protocol operation to generate the new NID configuration.

At block 518, the new NID configuration may be provided to the NID 502. For example, various configuration settings, data structures, and/or other information may be provided to the NID.

At block 520, NID 502 implements the new NID configuration. Once implemented, at block 522, NID 502 provide a new configuration confirmation to management controller 504. The confirmation may be provided to the VNID hosted by management controller 504.

Turning to FIG. 5B, continuing the discussion, at block 524 management controller 504 generates and sends a LLDP response to NID 502 for sending to switch 500. The LLDP response may be generated by the VNID in response to receiving the confirmation of the new configuration being implemented by the NID.

At block 526, NID 502 sends the LLDP response to the switch. The LLDP response may be sent on a port corresponding to the port that the LLDP frame was received on.

At block 528, NID 502 sends a LLDP response confirmation to management controller 504.

Thus, using the operations and actions illustrated in FIGS. 5A-5B, a NID that does not include port extension protocol operation processing capability may be enabled to process such operations thereby extending the functionality of the NID even if hardware limited. When doing so, the management controller may act as the control plane for the NID by processing the operations and reconfiguring the network data unit processing capabilities of the NID.

Additionally, by use of a management controller for processing control information such as LLDP messages, embodiments disclosed herein may reduce the susceptibility of a network to third party attacks. For example, in at least one embodiment, the management controller may not present itself as a separate, distinguishable endpoint from a host information handling system (at least with respect to the in-band connections of the host). Consequently, while a host information handling system may be subject to compromise via malicious attack through advertisement of its end point, the hosted management controller may not be subject to compromise via the same vectors. Accordingly, the distributed control plane in accordance with embodiments disclosed herein may be more resilient than other types of control planes that may be implemented by a host information handling system.

Figure 6:
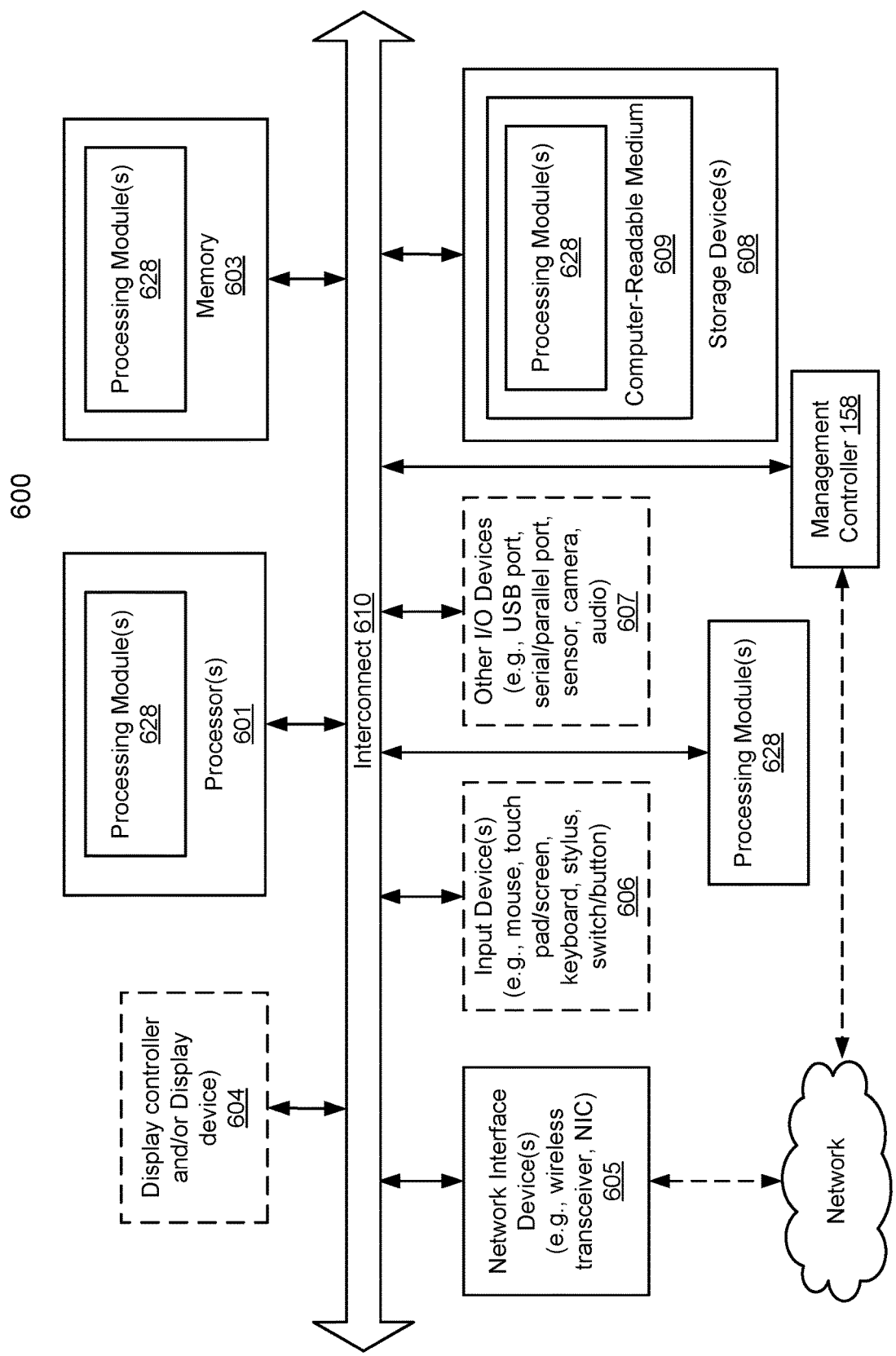
FIG. 6 shows a block diagram illustrating a computing device in accordance with an embodiment.

As discussed above, various components may be implemented with computing devices. For example, any of the components illustrated in FIGS. 1-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for operating an information handling system (IHS), the method comprising:
    obtaining, by a network interface device of the IHS and from a switch, a frame specifying a port extension protocol operation;
    providing, by the network interface device, the frame to a management controller hosted by the IHS;
    providing, by the management controller, the frame to a virtual network interface device hosted by the management controller, the virtual network interface device reflecting network connectivity of the network interface device and having port extension protocol processing capability;
    processing, by the virtual network interface device, the port extension protocol operation to obtain a new configuration for a network data unit processor of the network interface device;
    reconfiguring, by the management controller, the network data unit processor based on the new configuration to obtain an updated network interface device; and
    providing, based on the updated network interface device, an acknowledgement to the switch indicating that the updated network interface device will operate in accordance with the port extension protocol operation.

2. The computer-implemented method of claim 1, wherein the switch is directly connected to the network interface device.

3. The computer-implemented method of claim 1, wherein providing the frame to the virtual network interface device comprises:
    writing the frame to a virtual port of the virtual network interface device, the virtual port of the virtual network interface device corresponding to a port of the network interface device on which the frame was received.

4. The computer-implemented method of claim 3, wherein providing the acknowledgement to the switch comprises:
    providing the acknowledgement to the updated network interface device; and
    sending, by the network interface device, the acknowledgement to the switch via the port of the network interface device on which the frame was received.

5. The computer-implemented method of claim 1, wherein the updated network interface device performs network data unit processing for network data units received from the switch differently from the network interface device.

6. The computer-implemented method of claim 1, wherein the frame is a link layer discovery protocol frame.

7. The computer-implemented method of claim 6, wherein the port extension protocol operation is stored in a type-length-value structure of the frame.

8. The computer-implemented method of claim 7, wherein the frame comprises a control information portion and a link layer discovery data unit portion, the link layer discovery data unit portion comprising the type-length-value structure.

9. The computer-implemented method of claim 6, further comprising:
    obtaining, by the network interface device, port information specifying from which port of the network interface device the frame was received; and
    providing, by the network interface device, the port information along with the frame to the management controller.

10. The computer-implemented method of claim 1, wherein the management controller comprises a computing device that is hosted by the IHS, operates independently from the IHS, and is operably connected to the network interface device via a bus, wherein the bus provides for communications between other components of the IHS.

11. A non-transitory machine-readable medium having instructions stored therein, which when executed by a processor, cause the processor to perform operations for operating an information handling system (IHS), the operations comprising:

obtaining, by a network interface device of the IHS and from a switch, a frame specifying a port extension protocol operation;

providing, by the network interface device, the frame to a management controller hosted by the IHS;

providing, by the management controller, the frame to a virtual network interface device hosted by the management controller, the virtual network interface device reflecting network connectivity of the network interface device and having port extension protocol processing capability;

processing, by the virtual network interface device, the port extension protocol operation to obtain a new configuration for a network data unit processor of the network interface device;

reconfiguring, by the management controller, the network data unit processor based on the new configuration to obtain an updated network interface device; and providing, based on the updated network interface device, an acknowledgement to the switch indicating that the updated network interface device will operate in accordance with the port extension protocol operation.

12. The non-transitory machine-readable medium of claim 11, wherein the switch is directly connected to the network interface device.

13. The non-transitory machine-readable medium of claim 11, wherein providing the frame to the virtual network interface device comprises:

writing the frame to a virtual port of the virtual network interface device, the virtual port of the virtual network interface device corresponding to a port of the network interface device on which the frame was received.

14. The non-transitory machine-readable medium of claim 13, wherein providing the acknowledgement to the switch comprises:

providing the acknowledgement to the updated network interface device; and sending, by the network interface device, the acknowledgement to the switch via the port of the network interface device on which the frame was received.

15. The non-transitory machine-readable medium of claim 11, wherein the updated network interface device performs network data unit processing for network data units received from the switch differently from the network interface device.

16. An information handling system, comprising:
a processor;
a network interface device; and
a management controller adapted to perform operations for managing the network interface device, the operations comprising:

obtaining, from the network interface device, a frame specifying a port extension protocol operation, the frame originating from a switch;

providing the frame to a virtual network interface device hosted by the management controller, the virtual network interface device reflecting network connectivity of the network interface device and having port extension protocol processing capability;

processing, with the virtual network interface device, the port extension protocol operation to obtain a new configuration for a network data unit processor of the network interface device;

reconfiguring the network data unit processor based on the new configuration to obtain an updated network interface device; and providing, based on the updated network interface device, an acknowledgement to the switch indicating that the updated network interface device will operate in accordance with the port extension protocol operation.

17. The information handling system of claim 16, wherein the switch is directly connected to the network interface device.

18. The information handling system of claim 16, wherein providing the frame to the virtual network interface device comprises:

writing the frame to a virtual port of the virtual network interface device, the virtual port of the virtual network interface device corresponding to a port of the network interface device on which the frame was received.

19. The information handling system of claim 18, wherein providing the acknowledgement to the switch comprises:

providing the acknowledgement to the updated network interface device; and initiating sending, with the network interface device, the acknowledgement to the switch via the port of the network interface device on which the frame was received.

20. The information handling system of claim 16, wherein the updated network interface device performs network data unit processing for network data units received from the switch differently from the network interface device.

* * * * *